United States Patent
Morgan

(10) Patent No.: US 6,394,922 B1
(45) Date of Patent: May 28, 2002

(54) EMERGENCY REPLACEMENT BELT

(76) Inventor: Richard L. Morgan, 6960 10th St. North #310, Farmington, MN (US) 55128-7540

(*) Notice: Subject to any disclaimer, the term of this patent is extended or adjusted under 35 U.S.C. 154(b) by 0 days.

(21) Appl. No.: 09/484,384

(22) Filed: Jan. 14, 2000

(51) Int. Cl.$^7$ ................................................ F16G 13/02
(52) U.S. Cl. ..................................... 474/212; 474/253
(58) Field of Search ................................ 474/212, 255, 474/256, 213, 215, 253; 152/213 R, 234, 243; 294/82.1; 198/850; 59/84, 93, 79.1; 24/369, 265 H, 299

(56) References Cited

U.S. PATENT DOCUMENTS

| | | | |
|---|---|---|---|
| 3,194,082 A | | 7/1965 | Mollenkamp |
| 3,631,733 A | * | 1/1972 | Thompson, Jr. ............ 474/255 |
| 3,732,597 A | | 5/1973 | Epstein |
| 3,747,165 A | | 7/1973 | Brown |
| 4,207,776 A | | 6/1980 | Helt et al. |
| 4,271,888 A | * | 6/1981 | Robinson .................... 152/234 |
| 4,376,631 A | | 3/1983 | Garza |
| 4,779,411 A | * | 10/1988 | Kendall ...................... 59/84 X |
| 4,795,410 A | | 1/1989 | Alderfer |
| 4,799,522 A | * | 1/1989 | Ilon ........................ 152/213 R |
| 4,925,226 A | * | 5/1990 | Leonard, Jr. et al. ...... 294/82.1 |
| 4,979,929 A | * | 12/1990 | Hynes ..................... 474/255 X |
| 5,011,462 A | * | 4/1991 | Smith ........................ 474/255 |
| 5,307,852 A | * | 5/1994 | Preusker ..................... 152/243 |
| 5,308,292 A | * | 5/1994 | Mistry ........................ 474/253 |
| 5,368,526 A | * | 11/1994 | Hynes .................... 474/256 X |
| 6,138,820 A | * | 10/2000 | Ewert .......................... 198/850 |

* cited by examiner

Primary Examiner—David A. Bucci
Assistant Examiner—Colby Hansen

(57) ABSTRACT

A emergency replacement belt for replacing a broken fan or drive belt. The emergency replacement belt includes a flexible elongate element with a pair of opposite ends that are detachably attached together with a connector having either a J-shaped or a T-shaped hooking portion.

1 Claim, 2 Drawing Sheets

EMERGENCY REPLACEMENT BELT

BACKGROUND OF THE INVENTION

1. Field of the Invention

The present invention relates to fan and drive belts and more particularly pertains to a new emergency replacement belt for replacing a broken fan or drive belt.

2. Description of the Prior Art

The use of fan and drive belts is known in the prior art. More specifically, fan and drive belts heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,207,776; 3,747,165; 4,795,410; 4,376,631; 3,194,082; and U.S. Patent No. 3,732,597.

While these devices fulfill their respective, particular objectives and requirements, the aforementioned patents do not disclose a new emergency replacement belt. The inventive device includes a flexible elongate element with a pair of opposite ends that are detachably attached together with a connector having either a J-shaped or a T-shaped hooking portion.

In these respects, the emergency replacement belt according to the present invention substantially departs from the conventional concepts and designs of the prior art, and in so doing provides an apparatus primarily developed for the purpose of replacing a broken fan or drive belt.

SUMMARY OF THE INVENTION

In view of the foregoing disadvantages inherent in the known types of fan and drive belts now present in the prior art, the present invention provides a new emergency replacement belt construction wherein the same can be utilized for replacing a broken fan or drive belt.

The general purpose of the present invention, which will be described subsequently in greater detail, is to provide a new emergency replacement belt apparatus and method which has many of the advantages of the fan and drive belts mentioned heretofore and many novel features that result in a new emergency replacement belt which is not anticipated, rendered obvious, suggested, or even implied by any of the prior art fan and drive belts, either alone or in any combination thereof.

To attain this, the present invention generally comprises a flexible elongate element with a pair of opposite ends that are detachably attached together with a connector having either a J-shaped or a T-shaped hooking portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new emergency replacement belt apparatus and method which has many of the advantages of the fan and drive belts mentioned heretofore and many novel features that result in a new emergency replacement belt which is not anticipated, rendered obvious, suggested, or even implied by any of the prior art fan and drive belts, either alone or in any combination thereof.

It is another object of the present invention to provide a new emergency replacement belt which may be easily and efficiently manufactured and marketed.

It is a further object of the present invention to provide a new emergency replacement belt which is of a durable and reliable construction.

An even further object of the present invention is to provide a new emergency replacement belt which is susceptible of a low cost of manufacture with regard to both materials and labor, and which accordingly is then susceptible of low prices of sale to the consuming public, thereby making such emergency replacement belt economically available to the buying public.

Still yet another object of the present invention is to provide a new emergency replacement belt which provides in the apparatuses and methods of the prior art some of the advantages thereof, while simultaneously overcoming some of the disadvantages normally associated therewith.

Still another object of the present invention is to provide a new emergency replacement belt for replacing a broken fan or drive belt.

Yet another object of the present invention is to provide a new emergency replacement belt which includes a flexible elongate element with a pair of opposite ends that are detachably attached together with a connector having either a J-shaped or a T-shaped hooking portion.

Still yet another object of the present invention is to provide a new emergency replacement belt that is quick and easy to install.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
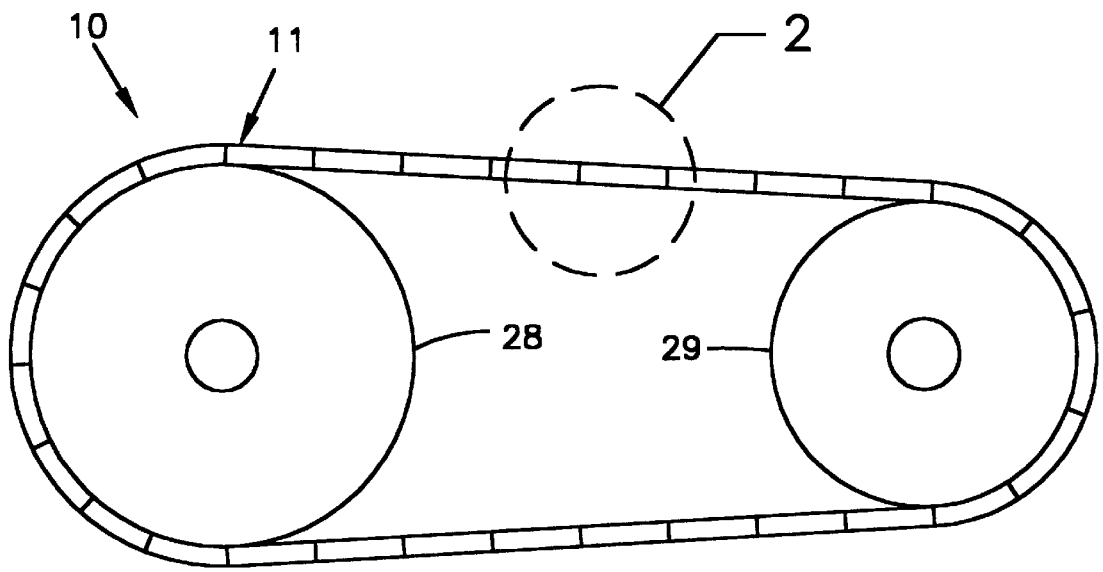
FIG. 1 is a schematic side view of a new emergency replacement belt in use as an endless-loop belt on a drive system according to the present invention.

With reference now to the drawings, and in particular to FIGS. 1 through 5 thereof, a new emergency replacement belt embodying the principles and concepts of the present invention and generally designated by the reference numeral 10 will be described.

As best illustrated in FIGS. 1 through 5, the emergency replacement belt 10 generally comprises a flexible elongate element with a pair of opposite ends that are detachably attached together with a connector having either a J-shaped or a T-shaped hooking portion.

The replacement belt is designed for replacing broken fan belts and drive belts in various mechanical drive systems. Specifically, the replacement belt 10 comprises a flexible elongate element 11 having a pair of opposite ends 12,13. The flexible elongate element comprises a length of chain having a plurality of interconnected links 14 with each end of the flexible elongate element has a corresponding link there adjacent. Ideally, the links comprise a plastic material such as a nylon or polyurethane material for durability and minimal wear on the pulleys of the drive system. The flexible elongate element may preferably has a length defined between the ends of the flexible elongate element of between about 3 feet and about 8 feet for providing a flexible range of use for the replacement belt.

A connector 15 detachably connects the ends of the flexible elongate element such that the flexible elongate element forms an endless-loop belt designed for use in a drive system as illustrated in FIG. 1. The connector preferably comprises the same or a similar plastic material as the flexible elongate element.

The connector includes an annular end portion 16 defining a circular central hole 17 therethrough. The link adjacent a first end 12 of the pair of ends of the flexible elongate element is extended through the central hole of the annular end portion of the connector to couple the annular end portion of the connector to the first end of the flexible elongate element.

Figure 2:
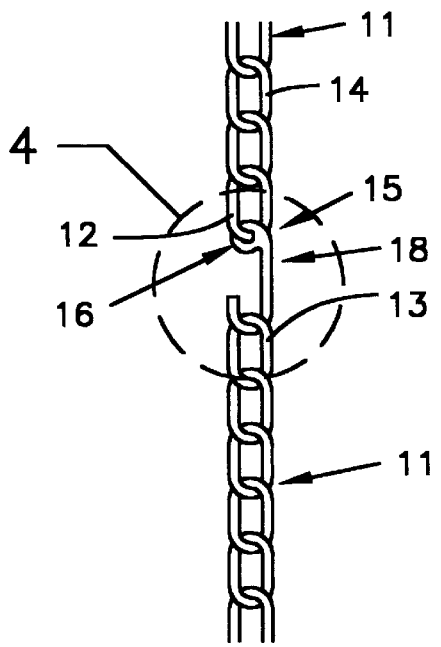
FIG. 2 is a schematic enlarged side view of a portion of one embodiment of the present invention taken from the vantage of the circular 2 on FIG. 1.
Figures 4, 5:
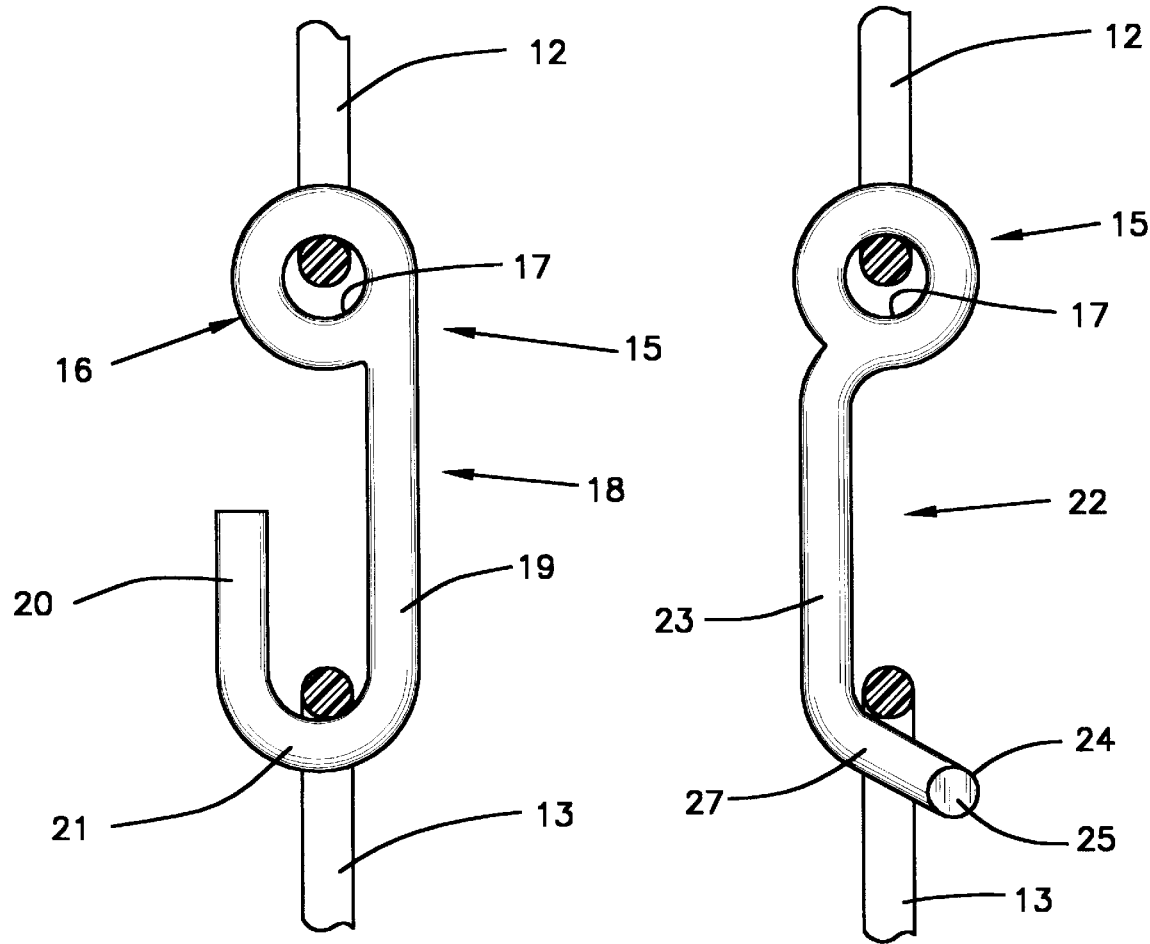
FIG. 4 is a schematic enlarged cross sectional view taken from circle 4 of FIG. 2 of the embodiment of the present invention illustrated in FIG. 2.
FIG. 5 is a schematic enlarged cross sectional view taken from circle 5 of FIG. 3 of the embodiment of the present invention illustrated in FIG. 3.

FIGS. 2 and 4 illustrate one embodiment of the connector having a generally J-shaped hooking portion 18 outwardly extending preferably tangentially from the annular portion of the connector. The J-shaped hooking portion and the annular end portion of the connector preferably also lie in a common plane with one another.

In this embodiment, the hooking portion of the connector has spaced apart and preferably substantially parallel proximal and distal elongate regions 19,20 and an arcuate middle region 21 connecting the proximal and distal elongate regions together. The proximal and distal elongate regions each have a length defined extending away from the arcuate middle region. Ideally, the length of the distal elongate region is between about one-fourth and about three-fourths the length of the proximal elongate region for providing a large enough brake between the annular end portion and the distal elongate region to permit easy extension of the distal elongate region through the link adjacent a second of the ends of the flexible elongate element.

As illustrated in FIGS. 2 and 4, the distal elongate region is extended through the link of the flexible elongate element adjacent a second of the ends of the flexible elongate element so that the connector couples the ends of the flexible elongate element together.

Figure 3:
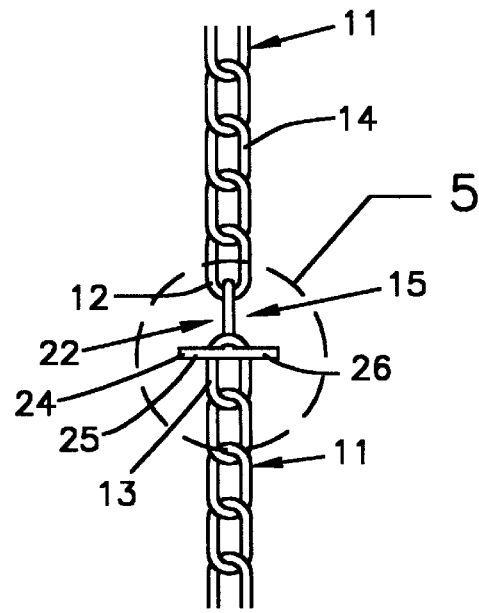
FIG. 3 is a schematic enlarged side view of a portion of another embodiment of the present invention taken from a similar vantage of FIG. 1 as FIG. 2.

FIGS. 3 and 5 illustrate another embodiment of the connector having a generally T-shaped hooking portion 22 outwardly extending non-tangentially from the annular end portion of the connector. In this embodiment, the hooking portion of the connector has proximal and distal elongate segments 23, 24 extending substantially perpendicular to one another.

The proximal elongate segment of the hooking portion is positioned adjacent the annular end portion of the connector so that the distal elongate segment of the hooking portion is spaced apart from the annular end portion. Preferably, the proximal elongate segment and the annular end portion of the connector lie in a common plane with one another. Even more preferably, the distal elongate segment is extended substantially perpendicular to this common plane.

The distal elongate segment has a pair of opposite side extents 25,26 outwardly extending in opposite directions from the proximal elongate segment. As illustrated in FIGS. 3 and 5, the side extents of the distal elongate segment of the connector are extended through the link of the flexible elongate element adjacent a second of the ends of the flexible elongate element such that the link adjacent the second end of the flexible elongate element is positioned on the proximal elongate segment between the annular end portion and the distal elongate segment so that the connector couples the ends of the flexible elongate element together.

With particular reference to FIG. 5, the proximal elongate segment may also have a distal region 27 adjacent the distal elongate segment extending at an obtuse angle to the proximal elongate segment for aiding extension of the distal elongate segment of the connector through the link of the second end of the flexible elongate element.

With reference to FIG. 1, when used to replace a broken endless-loop belt of a drive system, the flexible elongate element is looped around the pulleys 28,29 of the drive system. The ends of the flexible elongate element are then connected together with the particular connector provided on the flexible element to form a replacement endless-loop belt to drive the drive system.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A replacement belt, comprising:

a flexible elongate element having a pair of opposite ends;

said flexible elongate element comprising a length of chain having a plurality of interconnected links, each end of said flexible elongate element having a link there adjacent;

wherein said links comprise a plastic material;

a connector detachably connecting a first one of said ends of said flexible elongate element to a second one of said ends such that said flexible elongate element forms an endless-loop belt;

said connector comprising an annular end portion defining a central hole therethrough;

said link adjacent to said first of said ends of said flexible elongate element being extended through said central hole of said annular end portion of said connector to couple said annular end portion of said connector to said first end of said flexible elongate element;

said connector having a generally T-shaped hooking portion outwardly extending from said annular end portion of said connector;

said hooking portion of said connector having proximal and distal elongate segments extending substantially perpendicular to one another;

said proximal elongate segment of said hooking portion being positioned adjacent said annular end portion of said connector such that said distal elongate segment of said hooking portion is spaced apart from said annular end portion;

said distal elongate segment having a pair of opposite side extents outwardly extending in opposite directions from said proximal elongate segment;

said side extents of said distal elongate segment of said connector being extended through said link of said flexible elongate element adjacent to said second of said ends of said flexible elongate element such that said link adjacent said second end of said flexible elongate element is positioned on said proximal elongate segment between said annular end portion and said distal elongate segment so that said connector couples said ends of said flexible elongate element together; and said proximal elongate segment having a distal region adjacent said distal elongate segment extending at an obtuse angle to said proximal elongate segment.

* * * * *